2,991,282
PRODUCTION OF HECOGENIN AND TIGOGENIN FROM PLANT MATERIAL
Martin Rubin, Silver Spring, Md.
(3218 Pauline Drive, Chevy Chase, Md.)
No Drawing. Filed Oct. 15, 1956, Ser. No. 615,742
2 Claims. (Cl. 260—239.55)

This invention relates to the production of hecogenin from plant material; more particularly this invention relates to the attainment of pure hecogenin and tigogenin from the sisal plant (*Agave sisalana*).

It is well known that the juice of various of the agave plants, especially of the species *sisalana* and *fourcroydes*, contain steroidal sapogenins in the saponin form. These plants are cultivated in many tropical parts of the world for the production of sisal fiber. Ordinarily the plant leaf is mechanically stripped to obtain its fiber content of about 3%. The balance of the leaf material, both the pulp and the plant juice, is discarded as worthless waste. It is the plant juice which contains the steroidal saponins in soluble form.

The plant juice spontaneously ferments with a conversion during this self-fermentation of the original juice soluble steroidal glycosides into a juice insoluble steroidal sapogenins which separate out of the clear juice as a muddy sediment along with many other materials. The extremely low content of steroidal saponin in the sisal juice (of the order of 0.1%) makes the natural concentration by fermentation extremely important. By allowing the natural fermentation to concentrate the steroidal saponins, large quantities of sisal juice may be handled to recover the steroids therefrom by simply collecting the much smaller quantity of post-fermentation sediment through filtration, centrifugation or other suitable means. However, the sediment also contains a wide spectrum of impurities, notably plant pigments of the chlorophyll, carotenoid and flavinoid families. In addition, the sediment contains a high concentration of sugar and sugar derivatives which in the course of heating are converted into tarry resinous materials. Their presence severely complicates the isolation of the steroidal values. To a large extent the prior art has recognized many of the problems inherent in the recovery of the steroidal values from the plant juice (e.g. U.S. Patent 2,734,898 entitled "Production of Hecogenin from Plant Sources").

The prime object of the invention is to provide a simplified procedure for the isolation of steroidal sapogenins from plant juices.

A further object of the invention is to provide a simple and convenient method for the separation of the steroidal sapogenins into its component fractions.

Briefly stated this invention comprises subjecting the sludge obtained from the fermented sisal juice to hydrolysis in alcoholic acid. The alcoholic acid is a 10–30% solution of acid in a lower alcohol, specifically methyl, ethyl, or normal propyl. The acid is preferably HCl, although $H_2SO_4$ may be utilized. Upon completion of the hydrolysis the acid is neutralized by the addition of calcium hydroxide or oxide in solid form as a dry powder, or slurried in alcohol or water. Neutralization of the acid alcohol mixture is effected to a pH of at least 5.5, preferably to neutrality. Inasmuch as pH regulation by addition of a solid base to an acid liquid is difficult to control with precision, the resulting pH may even go to alkaline. Conveniently the change from acid to neutral is recognizable by a color change of the solution from a green tone to a yellow one. This appears to be due to a color change with pH by some of the flavanoids present in the solution.

In the course of neutralization many of the impurities are precipitated as calcium salts or are adsorbed on the lime. The alcohol may then be distilled from the pH adjusted mixture and recovered for re-use in the process. The residue is diluted with water to precipitate the steroids along with the various calcium compounds. Thereafter the solids are filtered out and washed well with water in order to remove the soluble color impurities. The various solid calcium compounds form a highly satisfactory filter cake.

The steroid values may be recovered from the lime cake by extraction with a solvent selected from the group consisting of acetone, methyl ethyl ketone, methanol, ethanol ethyl ether, and ethyl acetate. Concentration of the extract, and cooling, yields a crystalline mixture of sterols. The composition of the sterol mixture varies with the source of the sisal juice, the age of the plant from which it was obtained and the season of the year at the time of collection. However, in general it may be stated that the hecogenin content of this sterol mixture may vary between about 40 and 95%. The other sterol constituents are primarily tigogenin and a small amount of dehydrohecogenin.

It has been found that a further resolution of the mixture may be made by recrystallization from a suitable solvent, and substantially pure hecogenin recovered. Thus a substantially pure hecogenin fraction may be obtained by crystallization from normal amyl alcohol, dioxane or monochlorobenzene. The fraction which remains dissolved in the solvent consists primarily of tigogenin in which a small amount of hecogenin is present as an impurity. Refractory waxes are also present in this fraction.

The impure tigogenin mixture may in turn be conveniently converted to pure tigogenin by reduction according to the method of Huang-Minlon.[1] By chemically reducing the hecogenin content of the dissolved fraction to tigogenin, the quantity of tigogenin is augmented, and the subsequent separation of the tigogenin from the non-sterol impurities, e.g. the refractory waxes, is facilitated. Most importantly, the steroid recrystallized as product is substantially pure tigogenin. Accordingly the instant invention relates also to the recovery of pure hecogenin and pure tigogenin from the abundantly available sisal sludge.

As is well known, the hecogenin may be converted to cortisone drugs and the tigogenin to hormones of the classes of estrogen and of the so-called 19-nor hormones which have recently been discovered to have useful medicinal properties.

Example 1

One kg. of dried sisal sludge was obtained by centrifugation of sisal juice that had been allowed to ferment for four days; thereafter followed a sun drying of the centrifugate. This juice sample was obtained at the October harvest of leaves of fourteen year old *Agave fourcroydes* raised in the area of Tampico, Mexico.

The dried sludge was refluxed with 10 liters of ethanol and 2 liters of concentrated hydrochloric acid for a period of three hours. During this time all of the sludge dissolved in the alcoholic acid solution yielding a deep green solution. Calcium hydroxide powder was added, with stirring, until the pH of the mixture had reached 6.8. The alcohol was then removed by distillation, with recovery of 8.7 liters of the solvent. The residue in the still pot was diluted with 10 liters of hot water and filtered. The filter cake was washed with hot water until the filtrate had changed in color from amber to very pale yellow. The lime cake was then removed and extracted under reflux with two portions each of 2 liters of acetone. In this instance the lime cake was extracted without prior drying. The filtered 4 liters of acetone extract were concentrated to dryness to crystallize out the steroid, and the

[1] J.A.C.S. 71, 3303 (1949).

wet residue of steroid filtered after dilution with water. The steroid filter cake was dried; it weighed 120 g. The product was a cream colored solid with a melting point of 195–215° C. and an optical rotation of −35, 1% in chloroform.

If the lime cake was dried prior to the acetone extraction, the dilution with water (in effect a water wash) and filtration of the final sterol product could be eliminated. Thus in a more preferred mode the washed lime cake is dried, and then acetone extracted by two portions each of 2 liters of acetone. The product was obtained directly as crystals in the same yield and with the same physical constants by concentration of the acetone extract to about 150 ml. followed by filtration.

This crude steroid containing mixture, by analysis, had about 20% waxes, and the steroid balance had a composition of 60% hecogenin and 30% tigogenin. The mixture was recrystallized twice from ten volumes (125 g.) of n-amyl alcohol. The product (52 g.) of the final crystallization had a M.P. of 250–254° C., a rotation of 0° and was substantially pure hecogenin.

*Example 2.—Tigogenin recovery*

The combined amyl alcohol mother liquors were subjected to steam distillation to remove the solvent and recover the steroid residue. Fifty grams of residue were obtained. This material was dissolved in 500 ml. of ethylene glycol, and heated under reflux from five hours with 50 ml. of anhydrous hydrazine. The solution was cooled, 100 g. of solid potassium hydroxide added, and the combined solution distilled until the temperature of the distilling liquid was 212° C. At this point the reaction was set for reflux which continued for five hours. The mixture was cooled, poured into five volumes of ice and water, and the steroid which precipitated was removed by filtration and recrystallized, after drying, from ethyl acetate. Essentially pure tigogenin of M.P. 202–205° C. was obtained in yield of 45 g.

What is claimed is:

1. A process for the recovery of substantially pure tigogenin and hecogenin from sisal juice which comprises the steps of: (1) contacting with a solution of 10–30% acid in a lower alcohol the dried sisal sludge obtained from sisal juice that had been allowed to ferment; (2) adding lime in solid form until the pH of the mixture exceeds 5.5; (3) distilling off the alcohol; (4) diluting the solid residue with water and filtering then washing the filter cake with additional water; (5) extracting the filter cake with a member selected from the group consisting of acetone, methyl ethyl ketone, methanol, ethanol, ethyl ether, ethyl acetate, and mixtures thereof; (6) concentrating the extract at least until a crystalline precipitate is obtained; (7) recrystallizing the crystalline precipitate in a solvent selected from the group consisting of dioxane, monochlorobenzene and n-amyl alcohol, said recrystallized product constituting substantially pure hecogenin.

2. The process of claim 1 wherein substantially pure tigogenin is recovered from the fraction remaining in the mother liquor after recrystallizing out the hecogenin product by the additional steps of: (8) chemically reducing said fraction whereby the hecogenin portion of said fraction is converted to tigonenin; and (9) recrystallizing substantially pure tigogenin from the reduced fraction.

References Cited in the file of this patent

UNITED STATES PATENTS

| | | |
|---|---|---|
| 2,471,697 | Minlon | May 31, 1949 |
| 2,719,845 | Wall | Oct. 4, 1955 |
| 2,734,898 | Callow | Feb. 14, 1956 |
| 2,776,968 | Djerassi | Jan. 8, 1957 |
| 2,780,620 | Krider | Feb. 5, 1957 |
| 2,791,581 | Wall | May 7, 1957 |
| 2,827,456 | Holt et al. | Mar. 18, 1958 |

FOREIGN PATENTS

| | | |
|---|---|---|
| 313,262 | Switzerland | May 15, 1956 |

OTHER REFERENCES

Marker: J.A.C.S., September 1947, pp. 2168–2230, vol. 69.

Huang-Minlon: J.A.C.S., vol. 71, pp. 3303–3, 1949.

P. C. Spensley: Chemistry and Industry, pp. 229–231, April 14, 1956.